A. W. ARCHER.
WATER COOLED BEARING FOR PUMP SHAFTS.
APPLICATION FILED AUG. 31, 1920.
1,386,219.
Patented Aug. 2, 1921.
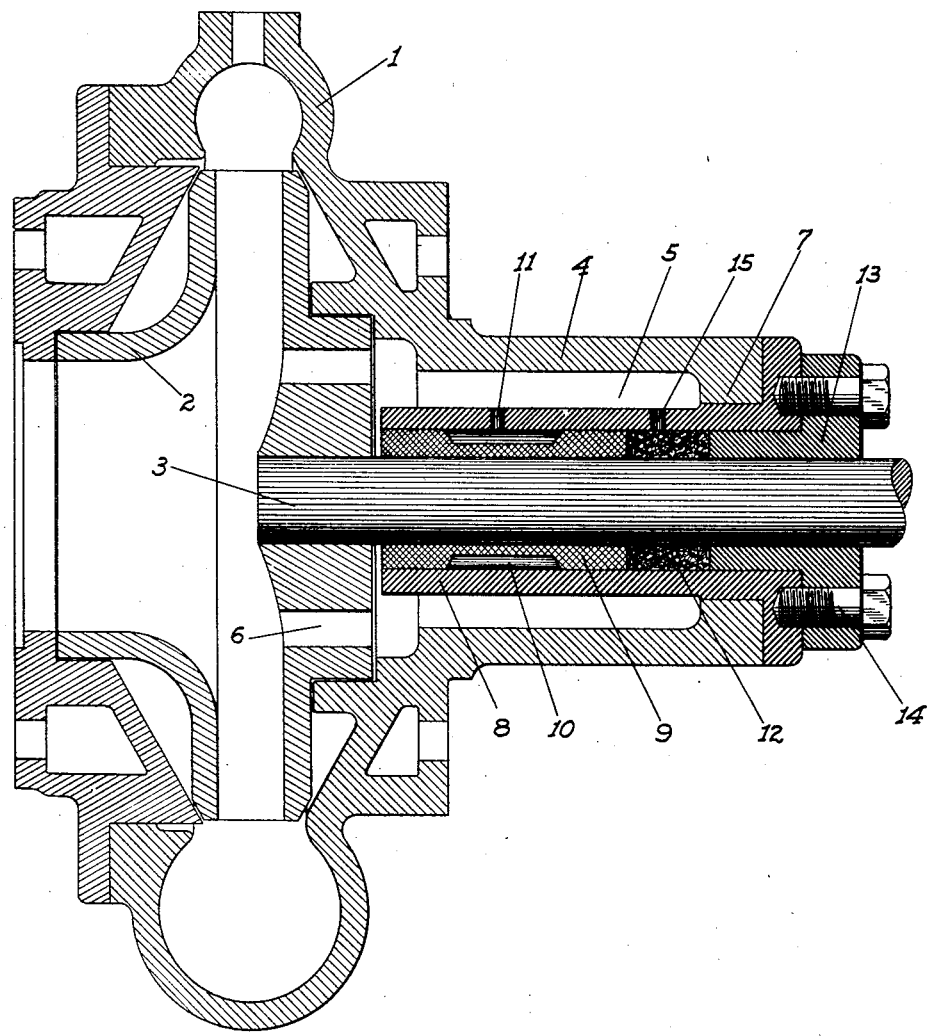
INVENTOR.
Alfred W. Archer
BY
ATTORNEY

UNITED STATES PATENT OFFICE.

ALFRED W. ARCHER, OF STOCKTON, CALIFORNIA, ASSIGNOR TO STERLING IRON WORKS, OF STOCKTON, CALIFORNIA, A CORPORATION.

WATER-COOLED BEARING FOR PUMP-SHAFTS.

1,386,219.   Specification of Letters Patent.   Patented Aug. 2, 1921.

Application filed August 31, 1920. Serial No. 407,089.

*To all whom it may concern:*

Be it known that I, ALFRED W. ARCHER, a citizen of the United States, residing at Stockton, in the county of San Joaquin, State of California, have invented certain new and useful Improvements in Water-Cooled Bearings for Pump-Shafts; and I do declare the following to be a full, clear, and exact description of the same, reference being had to the accompanying drawings, and to the characters of reference marked thereon, which form a part of this application.

This invention relates to improvements in pumps, and particularly to water pumps of the centrifugal type, the impellers or runners of which rotate at a high speed.

In this type of pump, the runner shaft naturally projects from the pump-casing in order that it may be connected to a motor or other form of driving means.

Inasmuch if any air should leak through the bearing of the shaft in the casing and get into the vacuum or intake chamber of the pump, it would materially reduce the efficiency of the pump, the packing around said shaft must be held in very close contact therewith, which while maintaining an air tight fit, causes excessive friction with the high speed at which the shaft rotates, so that very hot bearings and burnt packings result, necessitating constant attention and replacement if the pump is to be kept in efficient running trim.

The principal object of my invention therefore is to eliminate the over heating of the bearings by causing water to circulate around the bearing in much the same manner as a gas engine cylinder is cooled, this water being a portion of that drawn from the well or other source of supply with the rotation of the runner, so that a continuous and ever changing flow of water is had around the bearing, carrying off the heat of friction as soon as it is generated, and of course keeping the bearing always cool.

A second object is to so form the pump casing in connection with the shaft bearing that an entirely inclosed and compact unit is had, precluding the possibility of leakage of air or water into the water cooling area, and doing away with the necessity of any piping or other attachments.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

The figure on the drawings is a sectional plan view of my improved pump structure, featuring the water cooled bearing.

Referring now more particularly to the characters of reference on the drawings, the numeral 1 denotes the main casing of the pump designed and constructed in any suitable and approved manner, and containing the usual runner 2 mounted on a shaft 3 which projects from one end of the casing. Formed with the casing at this end and projecting outwardly therefrom concentric with the shaft and spaced a considerable distance therefrom is a cylindrical wall 4, forming a chamber 5 about the shaft, and open at both ends.

The inner end of course communicates with the intake chamber of the pump, either around the runner or through the usual counterbalancing holes 6 drilled through the adjacent wall thereof. The outer end of said wall 4 is shouldered inwardly toward the shaft as at 7, to form a water and air tight bearing for a sleeve 8 projecting into the chamber 5 concentric with the shaft but spaced therefrom and from the wall 4. This sleeve is fixed to the shoulder 7 by studs or cap screws (not shown).

Press-fitted into the sleeve 8 at the inner end thereof is a bushing 9 which makes a running fit with the shaft 3, the outer periphery of the bushing being cut away for a certain portion of its length from the center toward the ends, as shown at 10, thus leaving an inclosed space between the sleeve and bushing.

A hole 11 is drilled through the sleeve 8 to provide communication between the chamber 5 and the space 10.

Between the shaft and sleeve at the outer end of the bushing is a quantity of packing 12, held tightly against the shaft as is necessary by means of a packing gland 13 removably fitted to the sleeve by means of cap screws 14.

If desired, another hole 15 may be drilled through the sleeve 8 to communicate with the packing 12.

It will thus be seen that with the operation of the pump, a certain amount of the water drawn up by the runner will pass into and out of the chamber 5, and also get into the space 10 surrounding the shaft bushing, thus keeping the bearing cool at all times by reason of its constantly being changed and conducting the heat from the metal friction surfaces. The shaft will run satisfactorily without any lubricant, but if desired, a small hole may be drilled through the gland 13 to the shaft, and oil squirted thereinto occasionally, which oil will then of course be drawn along and spread over the entire bearing area.

From the foregoing description it will be readily seen that I have produced such a device as substantially fulfils the object of the invention as set forth herein.

While this specification sets forth in detail the present and preferred construction of the device still in practice such deviatitons from such detail may be resorted to as do not form a departure from the spirit of the invention as defined by the appended claims.

Having thus described my invention what I claim as new and useful and desire to secure by Letters Patent is:—

1. In a centrifugal pump, a casing, a runner therein, a shaft projecting from the casing and fixed to the runner, a circular extension formed with the casing and concentric with and spaced from the shaft, and a bearing sleeve for the shaft fixed to the casing and positioned in the extension and spaced therefrom, the extension opening into the casing all about the bearing.

2. In a centrifugal pump, a casing, a runner therein, a shaft projecting from the casing and fixed to the runner, a circular extension formed with the casing and concentric with and spaced from the shaft, a sleeve surrounding the shaft and fitted in the extension and spaced therefrom, a bushing in said sleeve to form a bearing for the shaft, said bushing being cut away for a portion of its length around its outer surface, packing surrounding the shaft beyond the bushing, the sleeve being provided with an orifice leading to the packing and with a similar orifice leading to the cut away portion of the bushing.

3. In a centrifugal pump, a casing, a runner therein, a shaft projecting from the casing and fixed to the runner, a circular extension formed with the casing and concentric with and spaced from the shaft, a sleeve surrounding the shaft and fitted in the extension and spaced therefrom, a bushing in said sleeve to form a bearing for the shaft, packing surrounding the shaft beyond the bushing, and means whereby a continuous supply of water may come in contact with the packing and with the bushing for the greater part of its length.

4. In a centrifugal pump, a casing, a runner therein, a shaft projecting from the casing and fixed to the runner, and a bearing for the shaft, the casing having a channel surrounding the bearing for the major portion of its length, said channel communicating with the interior of the casing all around the bearing.

5. In a centrifugal pump, a casing, a runner therein, a shaft projecting from the casing and fixed to the runner, a sleeve surrounding the shaft and spaced therefrom, said sleeve projecting into the casing and adapted to be surrounded by water, and a bushing in the sleeve forming a bearing for the shaft, the bushing being cut away for a portion of its length around its outer surface, and the sleeve being provided with an orifice leading to the cut away portion of the bushing.

In testimony whereof I affix my signature.

ALFRED W. ARCHER.